US009846421B2

(12) United States Patent
Sugeno et al.

(10) Patent No.: US 9,846,421 B2
(45) Date of Patent: Dec. 19, 2017

(54) DETECTING A COMMUNICATION ERROR STATUS

(71) Applicant: Sony Corporation, Tokyo (JP)

(72) Inventors: Naoyuki Sugeno, Fukushima (JP); Kohki Watanabe, Fukushima (JP); Shuichi Takizawa, Fukushima (JP)

(73) Assignee: SONY CORPORATION, Tokyo (JP)

( * ) Notice: Subject to any disclaimer, the term of this patent is extended or adjusted under 35 U.S.C. 154(b) by 397 days.

(21) Appl. No.: 14/417,613

(22) PCT Filed: Jul. 9, 2013

(86) PCT No.: PCT/JP2013/004226
§ 371 (c)(1),
(2) Date: Jan. 27, 2015

(87) PCT Pub. No.: WO2014/020830
PCT Pub. Date: Feb. 6, 2014

(65) Prior Publication Data
US 2015/0286198 A1      Oct. 8, 2015

(30) Foreign Application Priority Data

Aug. 3, 2012   (JP) ................................ 2012-173136

(51) Int. Cl.
*G05B 19/042*   (2006.01)
*G06F 11/07*   (2006.01)
(Continued)

(52) U.S. Cl.
CPC .............. *G05B 19/042* (2013.01); *B60L 3/00* (2013.01); *B60L 3/04* (2013.01); *B60L 11/1842* (2013.01);
(Continued)

(58) Field of Classification Search
CPC .......... G05B 19/042; G05B 2219/2639; G06F 11/0739; G06F 11/076
(Continued)

(56) References Cited

U.S. PATENT DOCUMENTS 7,788,546 B2 *   8/2010   Liberty ..................... G06F 1/24
                                                    714/48
2009/0077426 A1   3/2009   Liberty
2010/0328045 A1   12/2010  Goto et al.

FOREIGN PATENT DOCUMENTS

JP        2007-327828       12/2007

OTHER PUBLICATIONS

International Search Report issued in connection with International Patent Application No. PCT/JP2013/004226, dated Nov. 19, 2013. (3 pages).

* cited by examiner

*Primary Examiner* — Sun Lin
(74) *Attorney, Agent, or Firm* — Chip Law Group

(57) ABSTRACT

To reliably detect a communication error status and to resolve the communication error status when reliably recovered from the error status. A count value is changed into one of up and down directions when a communication error is detected by a communication error determination unit, the count value is changed into the other direction of the up and down directions when communication being normal is detected by the communication error determination unit, a communication error status is output when the count value becomes a first threshold value, and the communication error status is resolved when the count value becomes a second threshold value different from the first threshold value.

20 Claims, 9 Drawing Sheets

(51) Int. Cl.
　　*H04Q 9/00*　　　　(2006.01)
　　*G06F 1/26*　　　　(2006.01)
　　*G06F 11/30*　　　(2006.01)
　　*B60L 11/18*　　　(2006.01)
　　*B60W 20/00*　　　(2016.01)
　　*B60L 3/00*　　　　(2006.01)
　　*B60L 3/04*　　　　(2006.01)

(52) U.S. Cl.
　　CPC ....... *B60L 11/1851* (2013.01); *B60L 11/1864* (2013.01); *B60W 20/00* (2013.01); *G06F 1/26* (2013.01); *G06F 11/076* (2013.01); *G06F 11/0739* (2013.01); *G06F 11/30* (2013.01); *G06F 11/3058* (2013.01); *H04Q 9/00* (2013.01); *B60L 2200/12* (2013.01); *B60L 2240/545* (2013.01); *B60L 2240/547* (2013.01); *B60L 2240/549* (2013.01); *B60L 2240/70* (2013.01); *B60L 2270/147* (2013.01); *G05B 2219/2639* (2013.01); *H04Q 2209/43* (2013.01); *Y02E 60/721* (2013.01); *Y02T 10/7005* (2013.01); *Y02T 10/7061* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y04S 10/126* (2013.01)

(58) Field of Classification Search
　　USPC .......................................................... 320/132
　　See application file for complete search history.

[Fig. 1]
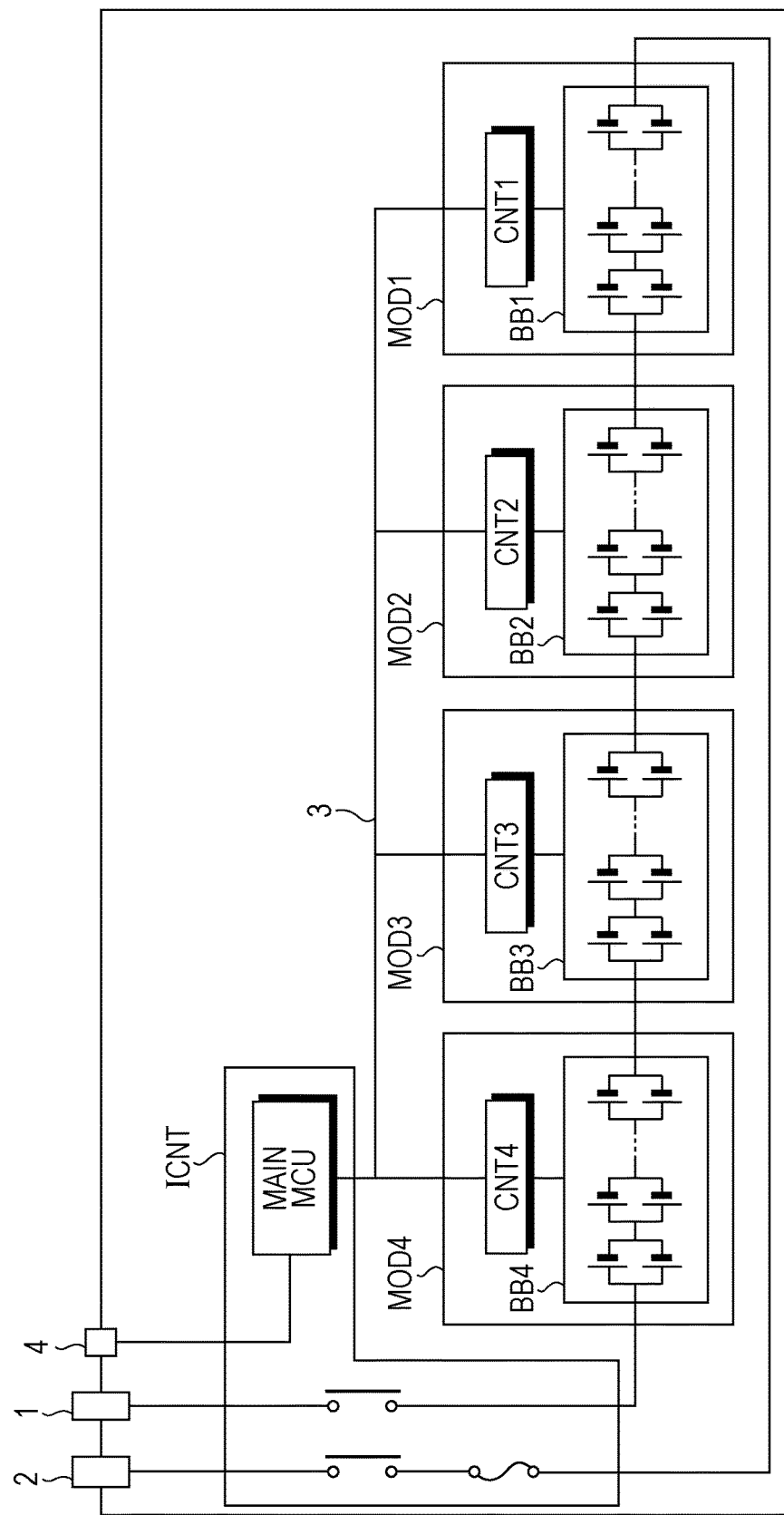

[Fig. 2]
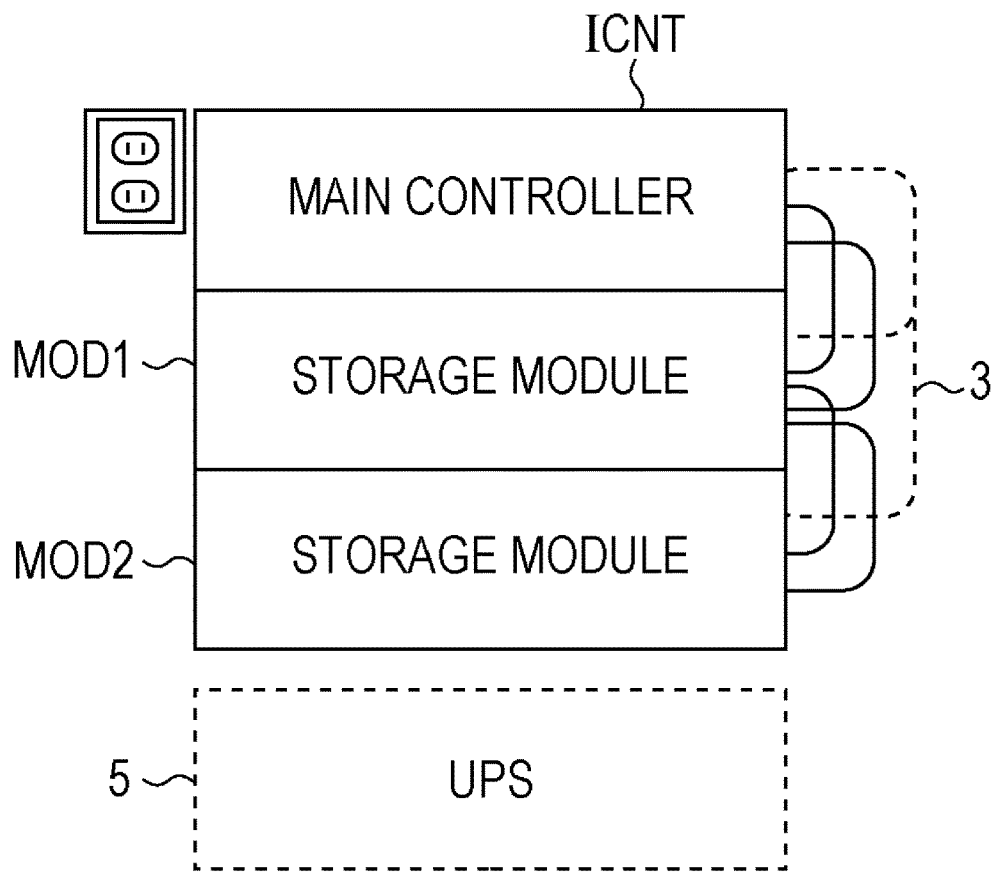
[Fig. 3]
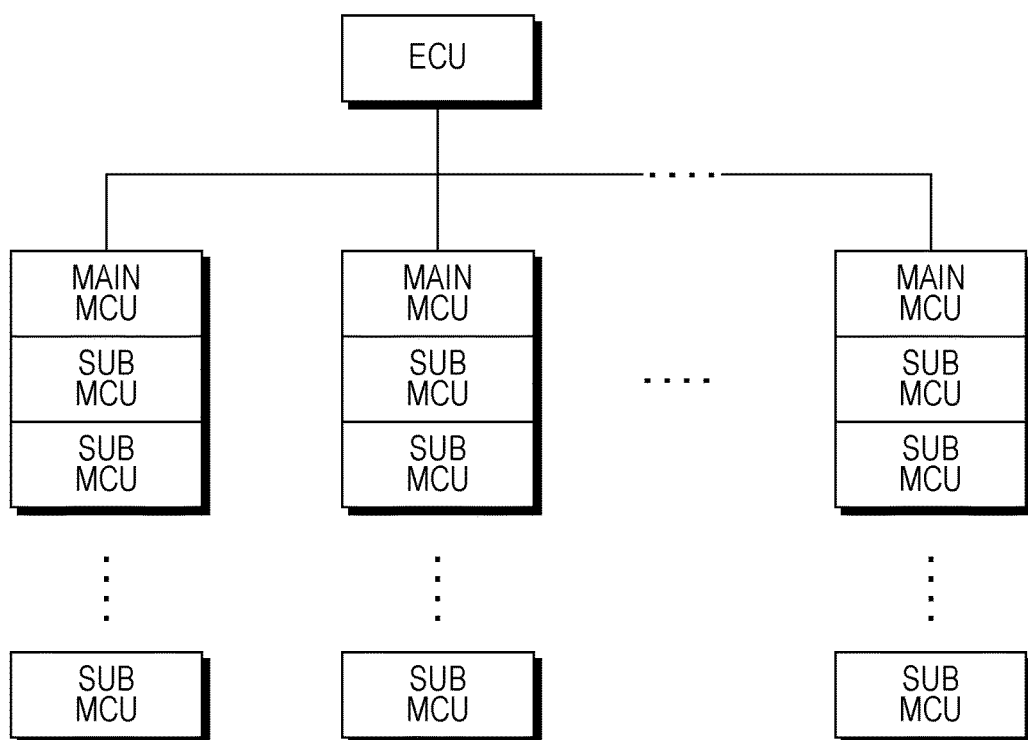

[Fig. 4]
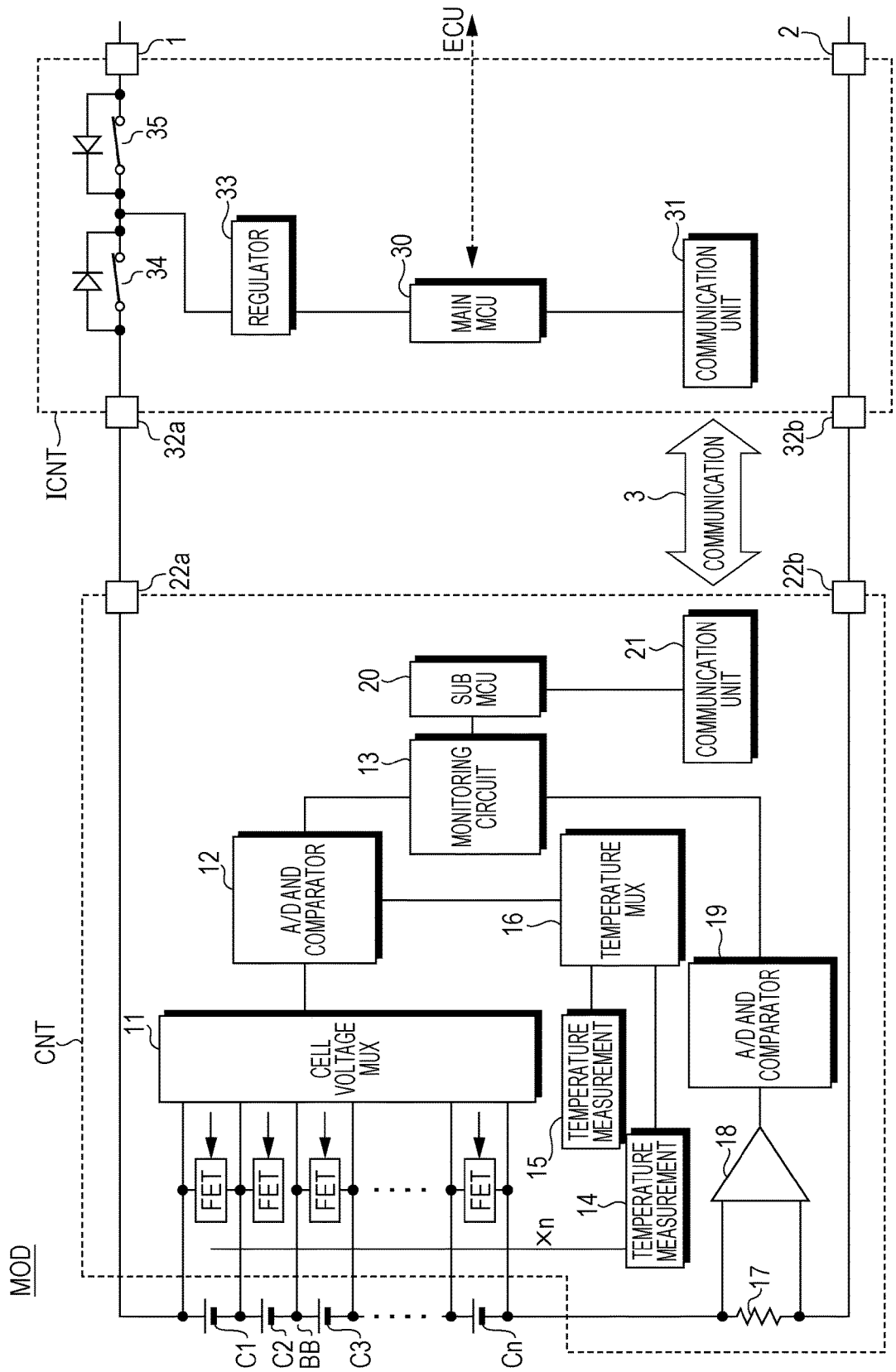

[Fig. 5]
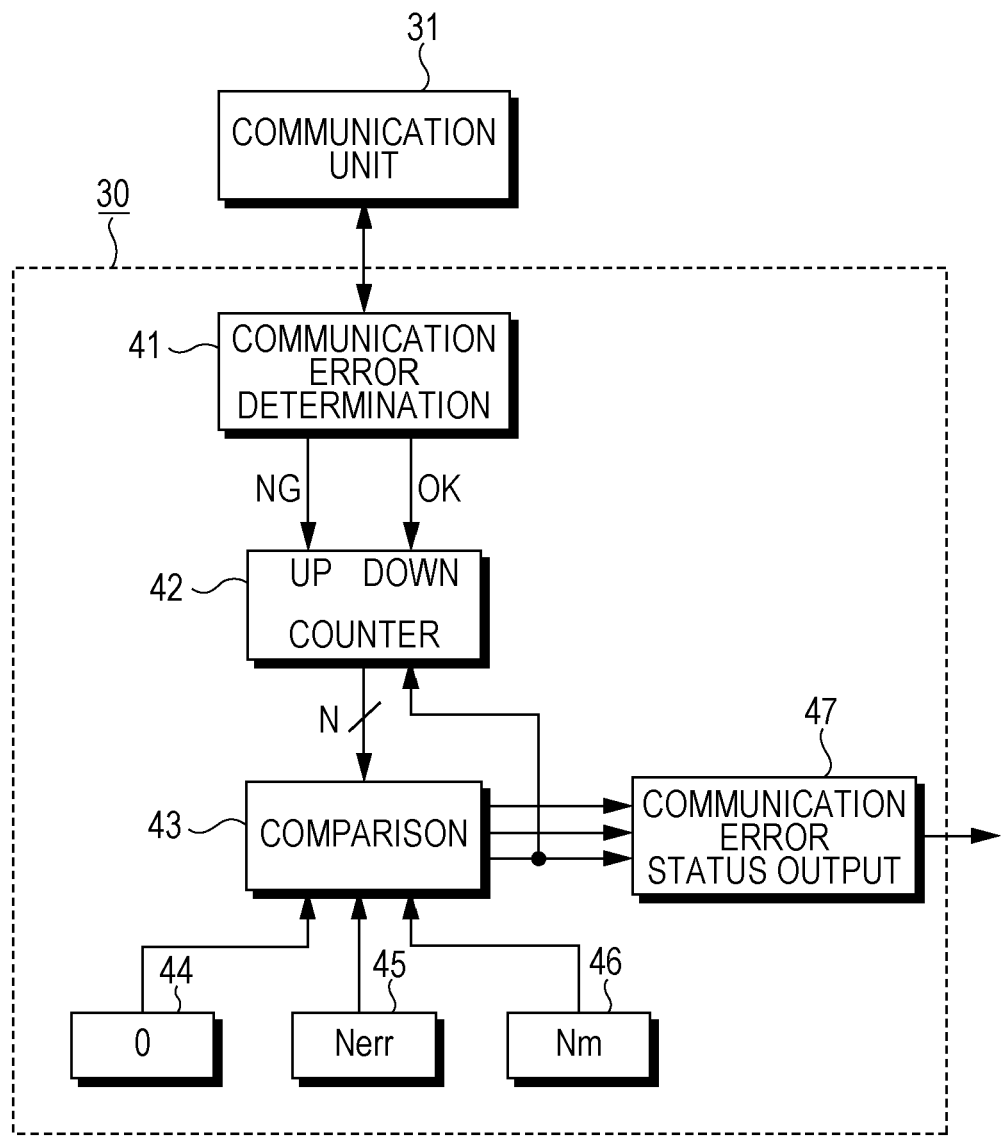

[Fig. 6]
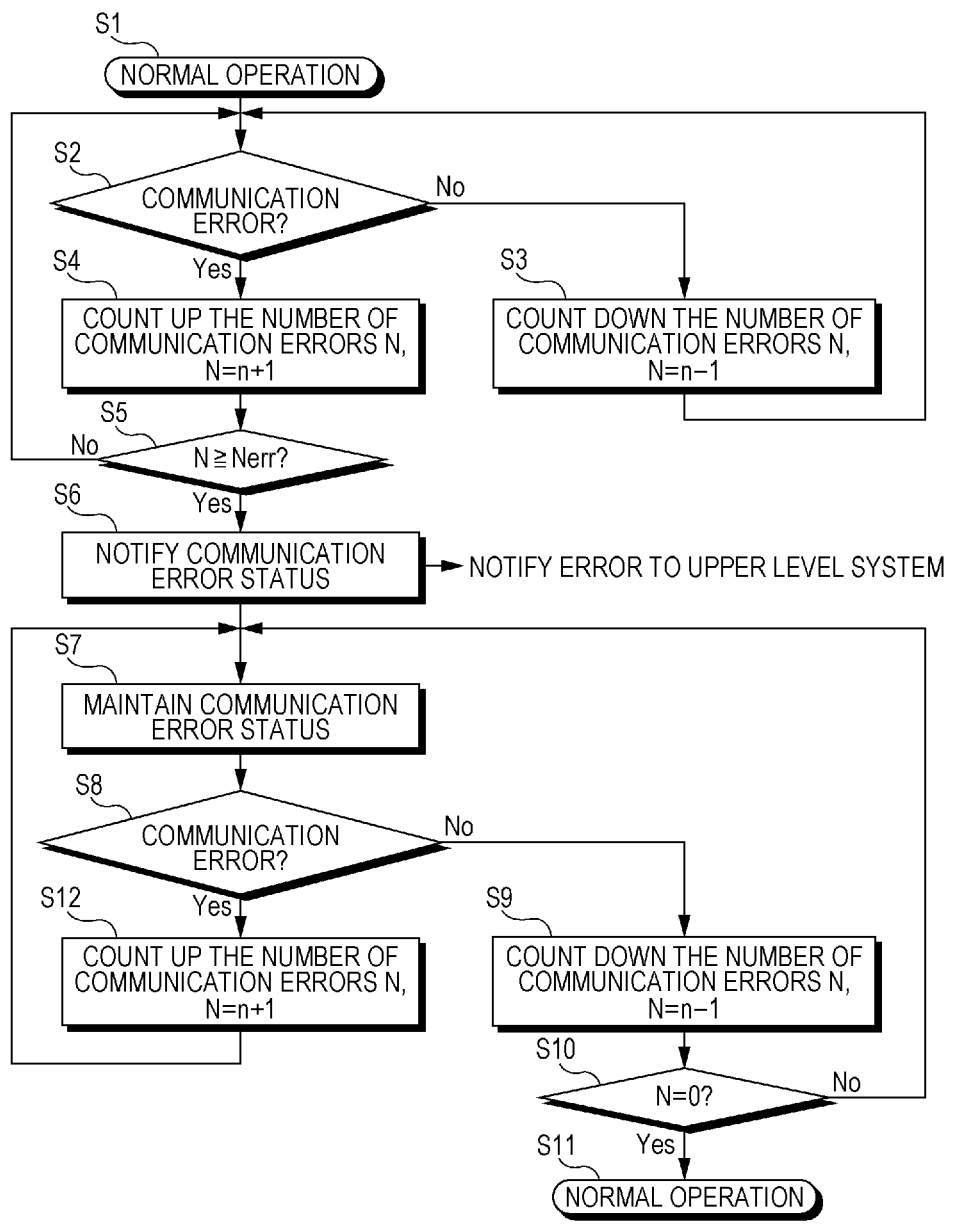

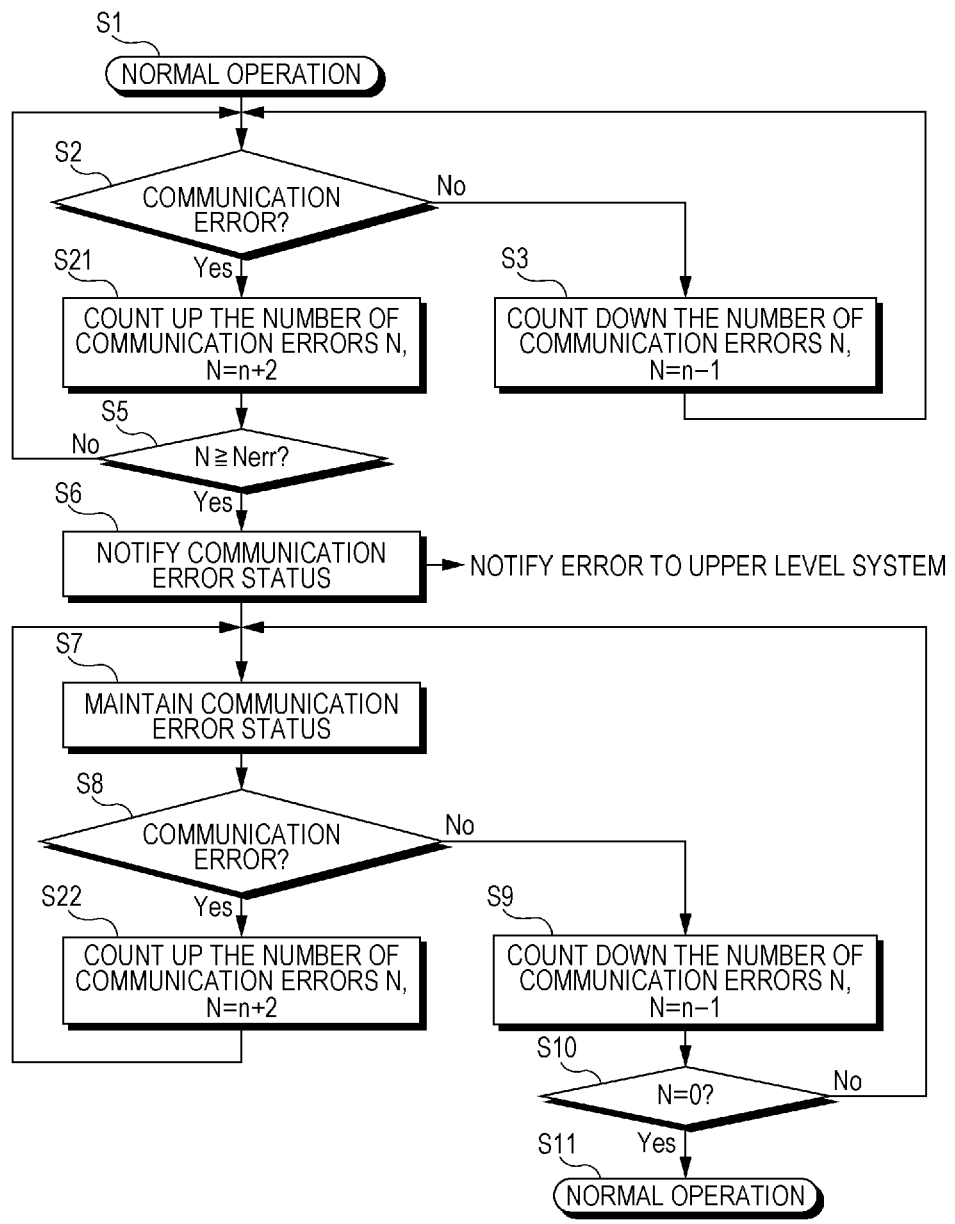
[Fig. 7]

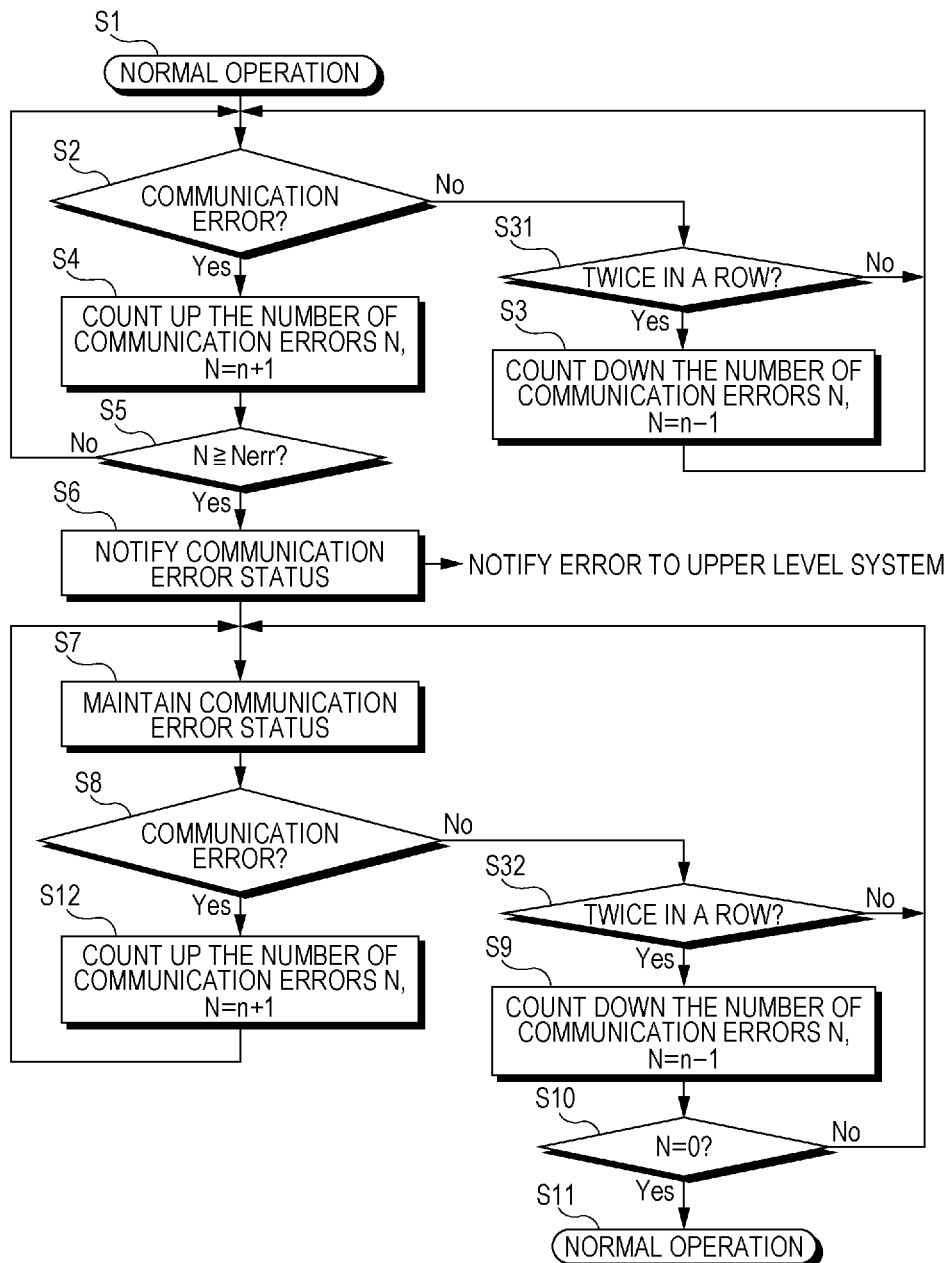
[Fig. 8]

[Fig. 9]
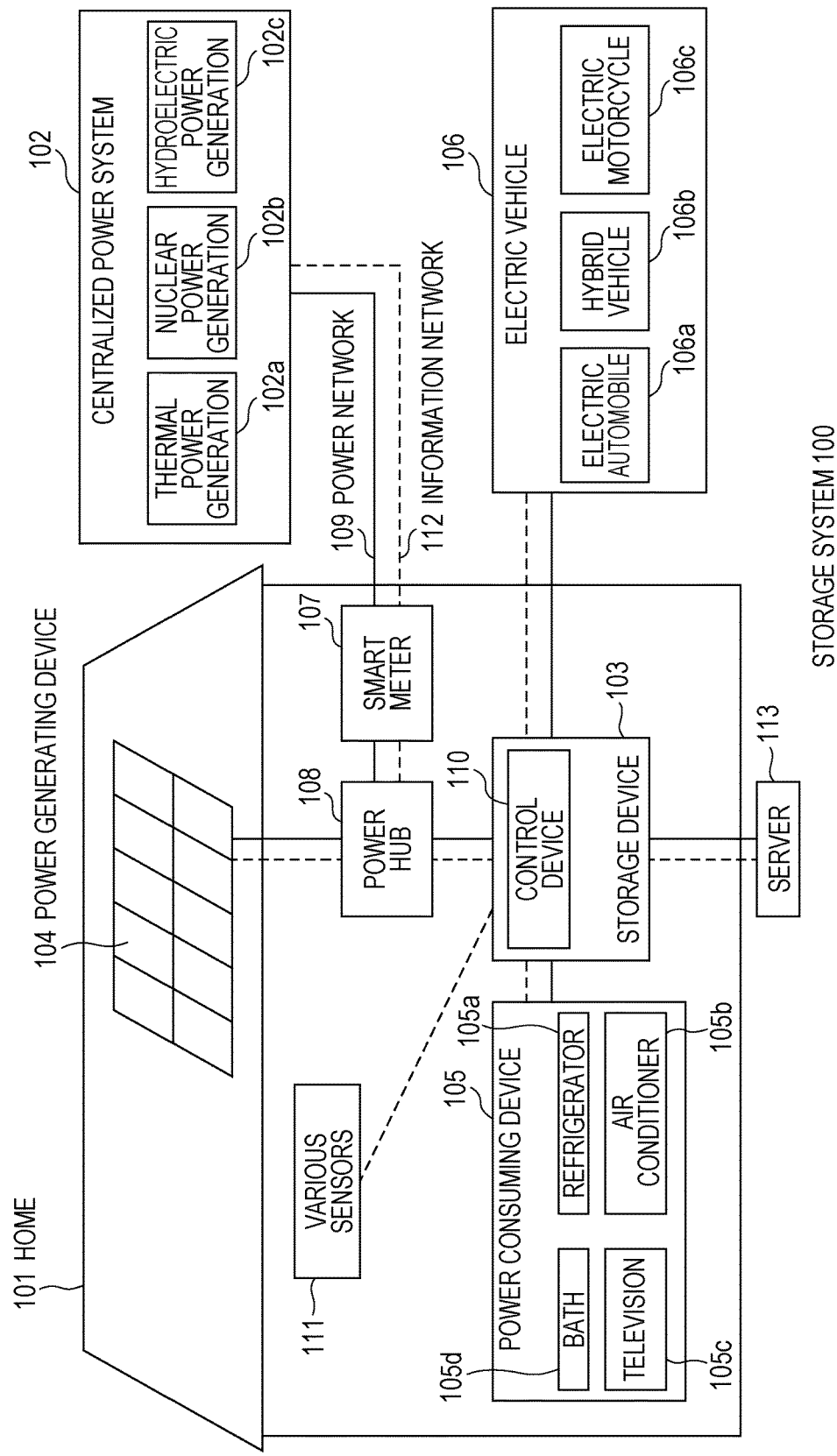

[Fig. 10]
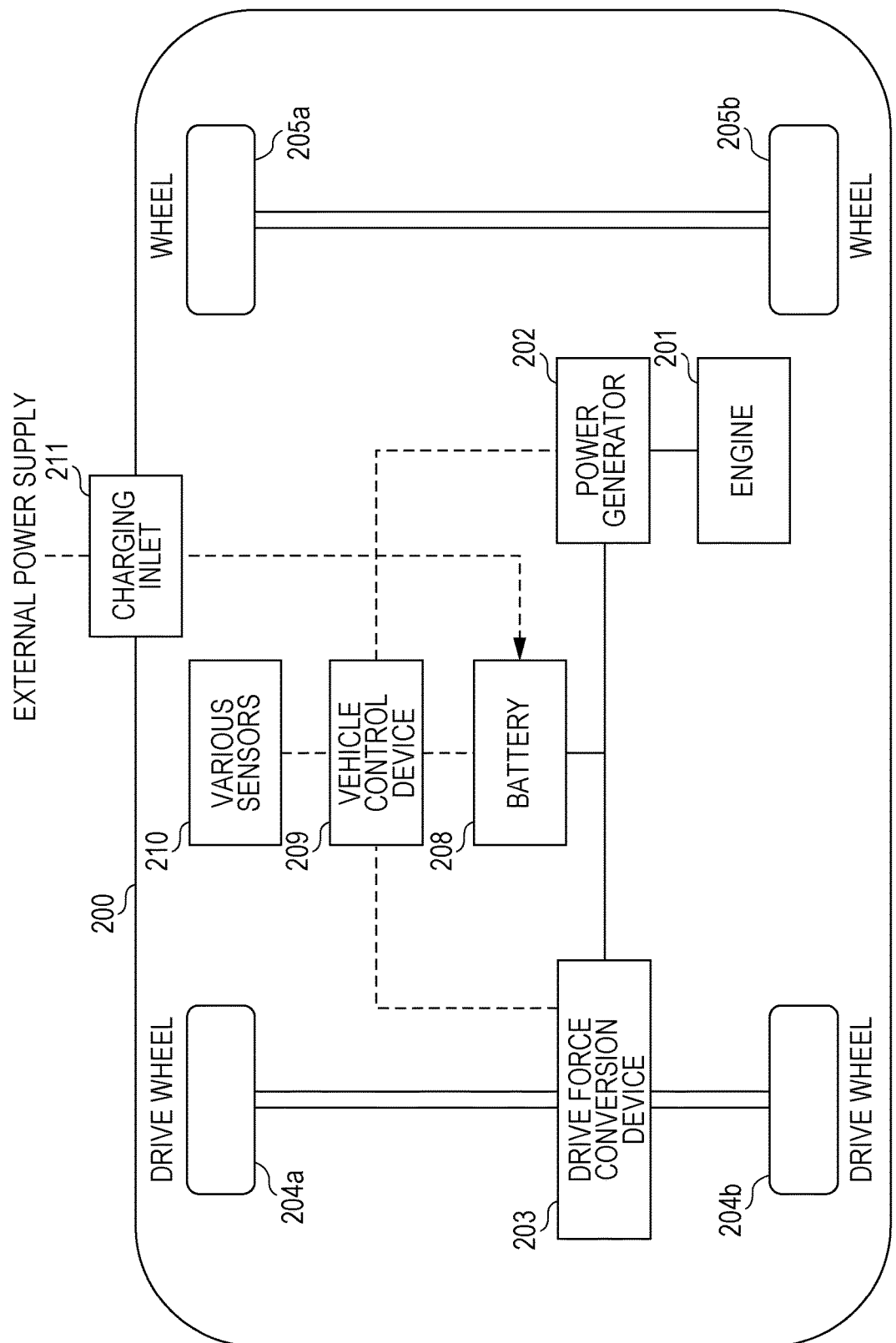

DETECTING A COMMUNICATION ERROR STATUS

CROSS REFERENCES TO RELATED APPLICATIONS

The present application is a national stage of International Application No. PCT/JP2013/004226 filed on Jul. 9, 2013 and claims priority to Japanese Patent Application No. 2012-173136 filed on Aug. 3, 2012, the disclosure of which is incorporated herein by reference.

BACKGROUND

The present disclosure relates to an information processing apparatus, a communication method, a power storage device, and an electric vehicle using power from the power storage device.

In recent years, uses of a secondary battery, such as a lithium-ion battery, have been rapidly expanded into uses for power storage of storage device, an automobile storage battery, and the like, where the secondary battery is combined with new energy systems, such as a solar battery and wind power generation. To generate high power, when a number of electrical storage elements, such as battery modules (also referred to as electric cells, or simply referred to as cells, in the following description, appropriately referred to as battery cells), are used, a configuration in which a plurality of storage modules are connected in series is employed. The storage module configures a battery block by connecting a plurality of battery cells, for example, four battery cells in parallel and/or in series. A number of battery blocks are housed in an exterior case to configure the storage module (also, referred to as a battery pack).

Further, a power storage device has been known, which connects a plurality of storage modules, and has a common control device (appropriately referred to as a main controller) to the plurality of storage modules. Each of the storage modules includes a module controller, and the module controller communicates with the main controller via a communication path.

The module controller monitor includes a monitoring circuit and a microcomputer (appropriately, referred to as a sub microcontroller unit) in order to monitor the status of the battery cells and to detect an error. The monitoring circuit monitors the voltage of each battery cell, compares a predetermined threshold value and the voltage of the battery cell with a comparator, and outputs a detection signal (for example, one-bit detection signal) that indicates normal/error.

At the time of charging, the voltage of each battery cell is compared with a predetermined value, and a detection signal that indicates whether the voltage is an overvoltage (appropriately, referred to as OV) is generated. At the time of discharging, the voltage of each battery cell is compared with a predetermined value, and a detection signal that indicates whether the voltage is an under voltage (appropriately, referred to as UV) is generated. At the time of charging/discharging, a current value that flows in a battery cell is compared with a predetermined value, and a detection signal that indicates whether the current value is an overcurrent (appropriately, referred to as OC) is generated. Further, at the time of charging/discharging, the temperature of each battery cell is compared with a predetermined value, and a detection signal that indicates whether the temperature is in an overheat status (appropriately, referred to as OT) is generated.

Further, a balance adjustment is performed in which a voltage and a current in each battery cell are supplied to the sub microcontroller unit of each module, and voltages of a plurality of battery cells are equalized. The above-described detection signals from the monitoring circuit are supplied to the sub microcontroller unit. Further, the detection signals are transmitted from the module controller to the microcomputer (appropriately, referred to as a main microcontroller unit) of the main controller via a communication path. The main controller receives the detection signals from each storage module and controls a charge/discharge operation.

Therefore, data communication between the sub microcontroller unit of the module controller and the main microcontroller unit of the main controller is absolutely necessary for a stable operation of the power storage device system. For example, Patent Literature 1 described below discloses that a power inverter (inverter) determines there is an error when an error detection signal is supplied from a protection circuit of an insulated gate bipolar transistor (IBGT) to a command unit at least twice.

CITATION LIST

Patent Literature

PTL 1: JP 2007-324828A

SUMMARY

Technical Problem

Patent Literature 1 discloses a technology that prevents the stop of the power inverter where a noise associated with switching of the IBGT is mixed into the protection circuit and a malfunction occurs in the protection circuit, and an error is detected even through it has not occurred. In a case of Patent Literature 1, a counter that counts an error detection signal is reset at an appropriate timing, for example, at a certain period. However, the error is not always resolved after the certain period, and the system may be stopped again. Meanwhile, in a case where the counter is reset after a sufficient time to resolve the error passes, a time to recover from the error status becomes longer.

Therefore, it is desirable to provide an information processing apparatus, a communication method, a power storage device, and an electric vehicle capable of detecting an error of data communication and of being recovered when the error status is resolved.

Solution to Problem

In order to solve the above problem, an embodiment of the present disclosure is an information processing apparatus configured to:

change a count value into one of up and down directions when a communication error is detected by a communication error determination unit, and change the count value into the other direction of the up and down directions when communication being normal is detected by the communication error determination unit;

output a communication error status when the count value becomes a first threshold value; and resolve the communication error status when the count value becomes a second threshold value different from the first threshold value.

Another embodiment of the present disclosure is a communication method including:

changing a count value into one of up and down directions when a communication error is detected by a communication error determination, and changing the count value into the other direction of the up and down directions when communication being normal is detected by the communication error determination;

outputting a communication error status when the count value becomes a first threshold value; and resolving the communication error status when the count value becomes a second threshold value different from the first threshold value.

Another embodiment of the present disclosure is an information processing apparatus configured to:

be connected with communication units of modules respectively having battery units, through a communication path;

when information on the modules is acquired through communication with the communication units, change a count value into one of up and down directions when a communication error is detected by a communication error determination unit, and change the count value into the other direction of the up and down directions when communication being normal is detected by the communication error determination unit;

determine it is a communication error status when the count value becomes a first threshold value; and resolve the communication error status when the count value becomes a second threshold value different from the first threshold value and to return to a normal status.

Another embodiment of the present disclosure is a power storage device including:

a module including a battery unit having a plurality of battery cells, a monitoring unit configured to detect voltages of the battery unit and of at least one battery cell of the plurality of battery cells, and a communication unit configured to communicate an output signal of the monitoring unit; and an information processing apparatus configured to receive the output signal of the monitoring unit of the module through a communication path, wherein the information processing apparatus is configured to:

when the output signal of the monitoring unit of the module is acquired through communication with the communication units, change a count value into one of up and down directions when a communication error is detected by a communication error determination unit, and change the count value into the other direction of the up and down directions when communication being normal is detected by the communication error determination unit;

determine it is a communication error status when the count value becomes a first threshold value; and resolve the communication error status when the count value becomes a second threshold value different from the first threshold value and return to a normal status. Another embodiment of the present disclosure is an electric vehicle that includes a converter converting power supplied from the above-described power storage device into a driving force of the vehicle, and a control device that performs information processing related to vehicle control based on information related to the power storage device.

Advantageous Effects of Invention

The present disclosure enters a communication error status when a communication error is counted by a predetermined number of times, and returns to a normal status when communication being normal is counted by a predetermined number of times. Therefore, the present disclosure can reliably detect the facts that it enters a communication error status due to a noise bursting into a communication path and the communication error status has resolved.

Additional features and advantages are described herein, and will be apparent from the following Detailed Description and the figures.

BRIEF DESCRIPTION OF THE FIGURES

FIG. 1 is a block diagram of an example of a power storage device.

FIG. 2 is a schematic diagram of an example of an appearance of the power storage device in use.

FIG. 3 is a block diagram illustrating a relation among controllers in the power storage device.

FIG. 4 is a block diagram of an example of a control unit of a storage module in the present disclosure.

FIG. 5 is a functional block diagram of a main microcontroller unit in an embodiment of the present disclosure.

FIG. 6 is a flowchart for describing a first example of processing of measures against communication errors in the embodiment of the present disclosure.

FIG. 7 is a flowchart for describing a second example of the processing of measures against communication errors in the embodiment of the present disclosure.

FIG. 8 is a flowchart for describing a third example of the processing of measures against communication errors in the embodiment of the present disclosure.

FIG. 9 is a block diagram of a first application example of the power storage device according to an embodiment of the present disclosure.

FIG. 10 is a block diagram of a second application example of the power storage device according to an embodiment of the present disclosure.

DETAILED DESCRIPTION

An embodiment to be described below is preferred specific examples of the present disclosure, and technically favorable various limitations are added thereto. However, the scope of the present disclosure is not limited by the embodiment unless the description below includes specific description to limit the present disclosure.

Note that the description of the present disclosure will be given according to the following order.

<1. Embodiment of the present disclosure>
<2. Application>
<3. Modification>
<1. Embodiment of the Present Disclosure>

Power Storage Device

When a number of electrical storage elements, such as battery cells, are used in order to generate high power, a configuration is employed in which a plurality of power storage units (hereinafter, referred to as "storage modules") is connected, and the plurality of storage modules is provided with a common control device. Such a configuration is referred to as a "power storage device". As the electrical storage element, a capacitor and the like may be used other than the battery.

The storage module is a unit of combination of a battery unit that includes a series connection of a plurality of battery cells, i.e., a plurality of lithium ion secondary batteries, or a series connection of a plurality of parallel connections of battery cells (battery blocks), and a module controller provided for each module. A sub micro-controller unit of each module controller is connected with a main microcontroller unit of a main controller that is a control device of the whole system, via a data transmission path (bus), and the main microcontroller unit performs charge control, discharge control, degradation suppression, and the like.

As a bus, a serial interface is used. Specific examples of the serial interface include an inter-integrated circuit (I2C) system, a system management bus (SM bus), a controller area network (CAN), and a serial peripheral interface (SPI).

As an example, communication by the I2C system is used. This system performs serial communication with a device directly connected thereto in a relatively short distance. One master and one or a plurality of slaves are connected with two lines. A data signal is transferred on one line based on a crosstalk transmitted through the other line. Each slave has an address and data contains the address. An acknowledgement is returned from a reception side by each one byte, and data transfer is conducted while confirming each other. In a case of a power storage device, the main microcontroller unit serves as a master, and the sub microcontroller unit serves as a slave.

The sub microcontroller unit of each module controller transmits data to the main microcontroller unit. For example, information on an internal status of the storage modules, that is, battery information, such as voltages of the battery cells, voltage information on the whole modules, current information, and temperature information, is transmitted from the sub microcontroller units to the main microcontroller unit, and charge processing and discharge processing of the storage modules are controlled.

FIG. 1 illustrates an example of a specific connection configuration of a power storage device. For example, four storage modules MOD1 to MOD4 are connected in series. In this case, an output voltage of the whole power storage device, for example, 200 V is taken out to a positive terminal 1 (VB+) and a negative terminal 2 (VB−). The storage modules MOD1 to MOD4 respectively include module controllers CNT1 to CNT4 and battery units BB1 to BB4 in which a plurality of parallel connections of a plurality of battery cells or of a plurality of battery blocks is connected. The battery units BB1 to BB4 are connected via a power source line.

Each module controller includes a monitoring circuit, a sub-control unit, and the like, as described below. A main controller ICNT and the module controllers CNT1 to CNT4 are connected via a common bus 3 of serial communication. The battery information on a voltage and the like of the modules is transmitted from the module controllers to the main controller ICNT. The main controller ICNT further includes a communication terminal 4 so as to enable communication with an external electronic control unit.

As illustrated in FIG. 2, the two storage modules MOD1 and MOD2 and the main controller ICNT are respectively formed into box-shaped cases, for example, and these cases are layered and used. There may be a case where an uninterruptable power supply (UPS) 5 is optionally used. As illustrated in a broken line in FIG. 2, the bus 3 that connects the main controller ICNT and the module controllers CNT of the storage modules is exposed outside the case. Therefore, a communication error may occur due to a surrounding noise bursting to the bus 3.

Further, in an embodiment of the present disclosure, as illustrated in FIG. 3, sub-control units (in the drawing, represented by a SUB MCU) of the storage modules are connected with the main microcontroller unit (in the drawing, represented by a MAIN MCU) in order to control the plurality of storage modules. Further, a plurality of main microcontroller units is connected with an uppermost level electronic control unit (in the drawing, represented by an ECU). The electronic control unit typically collectively refers to a unit that controls analog equipment. As an example, the electronic control unit refers to a control unit installed in an automobile (i.e., an electric automobile or a hybrid automobile).

An Example of a Module Controller and a Main Controller

An example of configurations of the module controller CNT and the main controller ICNT will be described with reference to FIG. 4. The battery unit BB is formed of n-battery cells C1 to Cn, for example, sixteen battery cells connected in series. As the battery unit BB, a configuration may be employed in which parallel connections of a plurality of battery cells are connected in series. The voltages of the cells are supplied to a cell voltage multiplexer 11, and respective voltages of the battery cells C1 to Cn are sequentially selected and are supplied to an A/D converter and comparator 12. Further, field effect transistors (FET) are provided to discharge respective battery cells C1 to Cn by cell-balance control.

The voltages of n-cells are subjected to time-division multiplexing by the cell voltage multiplexer 11, are converted into a digital signal and are further compared with a voltage threshold value in the A/D converter and comparator 12. The A/D converter and comparator 12 outputs digital voltage data of 14 to 18 bits of the battery cells and a comparison result of the voltages of the battery cells and the voltage threshold value (for example, an one-bit signal). The output signal of the A/D converter and comparator 12 is supplied to a monitoring circuit 13.

Further, a temperature measuring unit 14 that measures temperatures of the battery cells and a temperature measuring unit 15 that measures a temperature inside an IC. Temperature information from the temperature measuring units 14 and 15 is supplied to a temperature multiplexer 16. Temperature data multiplexed by the temperature multiplexer 16 is supplied to the A/D converter and comparator 12. The A/D converter and comparator 12 generate digital temperature data, and output a comparison result (for example, an one-bit signal) of the digital temperature data and a temperature threshold value. The A/D converter and comparator 12 also output a comparison result related to cell voltage data, as described above. Another A/D converter and comparator may be separately provided for temperature.

A resistance 17 that detects a current flowing in the battery unit (battery cells C1 to Cn) is connected with the battery unit BB in series. Voltages at both ends of the resistance 17 are supplied to an A/D converter and comparator 19 via an amplifier 18. The A/D converter and comparator 19 output digital current data and a comparison result (for example, an one-bit signal) of a current value and a current threshold value. An output signal from the A/D converter and comparator 19 is supplied to the monitoring circuit 13.

The one-bit signal output from the A/D converter and comparator 12 is a detection signal that indicates normal/error of the voltage of each battery cell. At the time of charging, the voltage of each battery cell is compared with a predetermined value, and a detection signal that indicates whether the voltage is an overvoltage OV is generated. At the time of discharging, the voltage of each battery cell is compared with a predetermined value, and a detection signal that indicates whether the voltage is an under voltage UV is generated. Further, another one-bit signal output by the A/D converter and comparator 12 is a detection signal that indicates an overheat OT of a temperature. The one-bit signal output by the A/D converter and comparator 19 is a detection signal that indicates a overcurrent OC of a current.

The above-described detection signal, voltage value data, current value data, and temperature data are supplied from the monitoring circuit 13 to a sub microcontroller unit 20. The monitoring circuit 13 and the sub microcontroller unit 20 are connected by serial communication, for example. The sub microcontroller unit 20 performs diagnosis processing of the module controller CNT using the received detection signal as necessary. A detection signal and data that indicates a result of the diagnosis processing output by the sub microcontroller unit 20 are supplied to a communication unit 21.

The communication unit 21 is an interface that performs serial communication, for example, I2C communication, via the main microcontroller unit of the main controller ICNT and the bus 3. Note that, as a communication system, a wired or wireless communication path can be used. Although omitted in FIG. 4, the sub microcontroller units of the module controllers of other storage modules are connected to the bus 3.

A positive terminal 22a and a negative terminal 22b of the storage module MOD are respectively connected with a positive terminal 32a and a negative terminal 32b of the main controller ICNT via power source lines.

A communication unit 31 of the main controller ICNT is connected to the bus 3. The main microcontroller unit 30 is connected to the communication unit 31, and communication performed through the communication unit 31 is controlled by the main microcontroller unit 30. Further, the main microcontroller unit 30 is connected to an upper level electronic control unit ECU via a communication path.

A power source voltage generated by a regulator 33 is supplied to the main microcontroller unit 30. The main controller ICNT includes a positive terminal 1 and a negative terminal 2. Switching units 34 and 35 are inserted in series in an output process of the power source. These switching units 34 and 35 are controlled by the main microcontroller unit 30. The switching units 34 and 35 respectively include a switching device (FET, IGBT, and the like) and a parallel diode.

At the time of prohibition of charge, the switching unit 34 is turned OFF. At the time of prohibition of discharge, the switching unit 35 is turned OFF. Further, when the charge or discharge is not performed, the switching devices of the switching units 34 and 35 are turned OFF. The main microcontroller unit 30 transmits data received from the storage modules MOD to the upper level electronic control units ECU. Further, the main microcontroller unit 30 receives a control signal related to the charge/discharge from the electronic control unit ECU.

As illustrated in FIG. 2, the power source lines connected between the storage modules MOD1 and MOD2 and the main controller ICNT are exposed outside the case. Therefore, a noise may sometimes be overlapped with the power source lines from an outside, and as a result, the power source voltage may be decreased. There may be a case where the regulator 33 may not correct the voltage drop, and a starting voltage of the main microcontroller unit 30 is reduced and is reset.

In this manner, when the voltage is reduced due to a noise, a predetermined waiting time is provided, instead of immediate re-start processing (initialization processing). By providing the waiting time, stabilization of the voltage is waited. With this processing, repetition of ON/OFF of the main microcontroller unit 30 in a short period of time can be prevented. Especially, repetition of ON/OFF during an access to the non-volatile memory at the time of initiation may lose data in the non-volatile memory. However, by the waiting time, the data may be safely recovered. Note that a regulator voltage monitoring unit is provided, and when the voltage is reduced due to a noise, stabilization of the power source voltage of the main microcontroller unit 30 is confirmed and re-start processing may be performed.

Further, since the communication line is exposed outside, a noise bursts into the communication line, and communication timing may be influenced. That is, a pulsed noise is received as a timing signal (clock) by mistake, and communication between the sub microcontroller unit 20 (communication unit 21) and the main microcontroller unit 30 (communication unit 31) loses synchronization, so that communication failure and a stand-by status occur. Since the communication path is commonly used by a plurality of storage modules, when such communication failure and a stand-by status occur in one storage module, the communication path is occupied, and the communication with other storage module becomes difficult.

Therefore, in the embodiment of the present disclosure, such a communication error is detected at the storage module side, and the communication unit 21 is reset. With the reset, occupation of the communication line is resolved. Then, a predetermined time interval is provided from the reset to a re-start of the communication unit 21. With this time interval, the communication unit 21 can be reliably re-started. Note that, when a noise enters the communication line, communication clock timing synchronization is confirmed, and when it is determined to be normal, communication may be re-started.

Communication Error Measures

For example, the main microcontroller unit 30 as the master in the I2C communication detects an error of communication with the sub microcontroller unit 20. FIG. 5 illustrates a block diagram of functions of the main microcontroller unit 30 related to the communication error.

A communication error determination 41 determines whether communication by the communication unit 31 is a communication error. As an example, the main microcontroller unit 30 collects data (a detection signal, data of the voltage value, data of the current value, and data of the temperature) from the module controllers CNT of the storage modules MOD with a predetermined period (for example, one second). However, a communication error may occur due to an error of the a circuit of the module controller CNT, a noise bursting into the bus 3, or the like. That is, in a case where the data from the module controller CNT may not be received for a predetermined time, data transmission is requested to the module controller CNT, and it is determined that there is a communication error when there is no reply to the request. The communication error determination 41 of the main microcontroller unit 30 detects such a case as a single communication error.

A determination result of the communication error determination 41 is supplied to a counter 42. The counter 42 is an up/down counter, and counts up (increment) by an communication error of the communication error determination 41 and counts down (decrement) by being not a communication error (referred to as "communication being normal"). A count value N of the counter 42 is supplied to a comparison 43.

Note that the direction to change the counter 42 may be inversed from the above direction. That is, a predetermined initial value is set to the counter 42, and an operation of counting down may be performed every time a communication error occurs while an operation of counting up may be performed every time the communication being normal occurs. In this example, a first threshold value smaller than the initial value is supplied to the comparison 43 and the initial value serves as a second threshold value.

A first threshold value 45, a second threshold value 44, and a third threshold value 46 are supplied to the comparison 43. The first threshold value 45 is a value Nerr for determining whether it is in a communication error status. The second threshold value 44 is a value for resolving the communication error status, and is, for example, zero. The third threshold value 46 is a value Nm that is larger than the first threshold value Nerr. The threshold value Nm is a limit value when counting up, and when and after the count value N reaches the threshold value Nm, a control signal is supplied to the counter 42 not to allow the count value N to increase even if an communication error occurs, and the counting up operation of the counter 42 is stopped with the control signal.

The comparison 43 compares the count value N with these threshold values. As a result of the comparison by the comparison 43, a comparison result of the count value N and the first threshold value Nerr, a comparison result of the count value N and the second threshold value (0), and a comparison result of the count value N and the third threshold value Nm are obtained.

These comparison results are supplied to a communication error status output 47. The communication error status output 47 generates an output indicating a normal status where there is no communication error, an output indicating a communication error status, and an output indicating a communication error status and the count value N is the limit value Nm. A shutdown switch as a switching device that controls whether an output of the storage module is allowed is controlled with the output indicating a communication error, and an output operation of the storage module is stopped. Along with this, the communication error status is notified to the upper level electronic control unit ECU.

That is, when the number of errors counted by the counter 42 reaches the first threshold value Nerr set in advance, it becomes a communication error status. In the communication error status, the main controller ICNT may not obtain information from the storage module. In this status, the main microcontroller unit 30 operates the shutdown switch in terms of securing safety and stops a system control operation (a charge/discharge operation, an output operation of the power source voltage, and the like). In a case where a plurality of storage modules is connected to the main controller ICNT, occurrence of a communication error is determined by each storage module. However, when the above-described communication error status occurs with respect to one storage module, a control operation of the whole system is stopped.

Even in a case where the system control operation is stopped, the main microcontroller unit 30 communicates with the storage modules periodically. Then, the communication is succeeded, and a single communication being normal occurs, the counter 42 that holds the number of communication errors is decremented. When a value of the counter reaches the first threshold value, it is determined that the communication error status has been resolved. The fact that the communication error status has been resolved is notified to the electronic control unit ECU, and the operation of the system is recovered.

A first example of a control operation by the main microcontroller unit 30 will be described with reference to a flowchart in FIG. 6. The first example equalizes a first amount of change of the count value N changed by the communication error and a second amount of change of the count value N changed by the communication being normal. For example, the amount of change is 1. Other values may be employed as the amount of change.

Step S1: A normal operation is performed. That is, as described above, the main microcontroller unit 30 (master) periodically communicates with the sub microcontroller unit 20 (slave) to obtain data from the storage module MOD.

Step S2: Determination as to whether it is a communication error is performed in every periodical communication. As a result of the determination, results of a communication error and communication being normal are obtained.

Step S3: The counter is counted down by the communication being normal. That is, a previous value n is set to be −1. After step S4, the processing returns to step S2 (determination processing as to whether it is a communication error). Note that, when N=0, the countdown operation is not performed.

Step S4: The counter is counted up by a communication error. That is, a previous value n is set to be +1. The number of communication errors N is set to be (N=n+1). However, when the count value N is the limit value Nm, the counting up is prohibited. For example, it is set that Nm=6.

Step S5: The count value N and the first threshold value Nerr are compared. When it is not N Nerr, the processing returns to step S2 (determination processing as to whether it is a communication error). When it is N Nerr, it is determined that it is in a communication error status. For example, it is set that Nerr=5.

Step S6: When it becomes the communication error status, the system control operation is stopped and the communication error status is notified to the upper level system.

Step S7: The communication error status is maintained.

Step S8: Determination as to whether it is a communication error is performed in every periodical communication. As a result of the determination, results of a communication error and communication being normal are obtained.

Step S9: The counter is counted down by the communication being normal. That is, a previous value n is set to be −1.

Step S10: The count value N and the second threshold value (0) are compared. When it is not N=0, the processing returns to step S7 (determination processing as to whether it is a communication error). When N=0, the communication error status is resolved, and it becomes a normal operation (step S11). In the normal operation, the system control operation is performed.

Step S12: When it is determined in step S8 that it is a communication error, the number of communication errors N is counted up. That is, a previous value n is set to be +1. However, when the count value N is the limit value Nm, the counting up is prohibited. Then, the processing returns to step S7 (the communication error status is maintained).

A second example of the control operation by the main microcontroller unit 30 will be described with reference to a flowchart in FIG. 7. The second example weights a first amount of change of a count value N changed by a communication error and a second amount of change of a count value N changed by communication being normal. For example, the amount of change of counting up by a communication error is 2, and the amount of change of counting down by communication being normal is 1. The number of communication being normal of returning from the communication error status to a normal status becomes double, compared with the number of communication errors until it becomes the communication error status. In this manner, after the communication being normal is reliably detected, the operation returns to a normal status.

Processing common to the flowcharts in FIGS. 6 and 7 are denoted with the same reference signs. Steps S21 and S22 in FIG. 7 are characteristic processing in the second example.

Step S21: The counter is counted up by a communication error as a result of the determination in step S2. That is, a previous value n is set to be +2. The number of communication errors N is set to be N=n+2. However, when the count value N is the limit value Nm, the counting up is prohibited.

Step S22: The number of communication errors N is counted up when it is determined in step S8 that it is a communication error. That is, a previous value n is set to be +2. However, when the count value N is the limit value Nm, the counting up is prohibited. Then, the processing returns to step S7 (the communication error status is maintained).

In the above-described first and second examples, the first and the third threshold values are set to be Nerr=5 and Nm=6. However, these values are an example, and other values may be set. For example, the values may be set to be Nerr=10 and Nm=16.

A third example of the control operation by the main microcontroller unit 30 will be described with reference to a flowchart in FIG. 8. The third example weights a first amount of change of to count value N changed by a communication error and a second amount of change of a count value N changed by communication being normal, similarly to the second example. A method of weighting is, not to change the amount of change itself like the second example, but to change the number of times so that the amount of change is substantially changed.

For example, the amount of change of counting up by a communication error and the amount of change of counting down by communication being normal are equally set to be 1, and when the communication being normal occurs twice, the countdown operation is performed. Furthermore, in the third example, when the communication being normal occurs twice in a row, the countdown operation is performed. In this way, after the communication being normal is reliably detected, the operation returns to a normal status.

Processing common to the flowcharts in FIGS. 6 and 8 are denoted with the same reference signs. The amount of change at the time of counting down in steps S3 and S9 and the amount of change at the time of counting up in steps S4 and S12 are both 1. Steps S31 and S32 in FIG. 8 are characteristic processing in the third example.

Step S31: Whether the communication being normal as a result of the determination in step S2 occurs twice in a row. When it does, the counter is counted down. That is, a previous value n is set to be −1. The number of communication errors N is set to be N=n−1. When the communication being normal does not occur twice in a row even if detected, the processing returns to step S2 (determination processing as to whether it is a communication error).

Step S32: Whether the communication being normal as a result of the determination in step S8 occurs twice in a row is determined. When it does, the counter is counted down. That is, a previous value n is set to be −1. The number of communication errors N is made to be N=n−1. When the communication being normal does not occur twice in a row even if detected, the processing returns to step S7 (the communication error status is maintained).

Note that the present disclosure may employ the following configurations.

(1)

An information processing apparatus configured to:

change a count value into one of up and down directions when a communication error is detected by a communication error determination unit, and change the count value into the other direction of the up and down directions when communication being normal is detected by the communication error determination unit;

output a communication error status when the count value becomes a first threshold value; and resolve the communication error status when the count value becomes a second threshold value different from the first threshold value.

(2)

The information processing apparatus according to (1), wherein a first amount of change of the count value changed by the communication error and a second amount of change of the count value changed by the communication being normal are equalized.

(3)

The information processing apparatus according to (1), wherein a first amount of change of the count value changed by the communication error is set larger than a second amount of change of the count value changed by the communication being normal.

(4)

A communication method including:

changing a count value into one of up and down directions when a communication error is detected by a communication error determination, and changing the count value into the other direction of the up and down directions when communication being normal is detected by the communication error determination;

outputting a communication error status when the count value becomes a first threshold value; and resolving the communication error status when the count value becomes a second threshold value different from the first threshold value.

(5)

The communication method according to (4), wherein a first amount of change of the count value changed by the communication error and a second amount of change of the count value changed by the communication being normal are equalized.

(6)

The communication method according to (4), wherein a first amount of change of the count value changed by the communication error is set larger than a second amount of change of the count value changed by the communication being normal.

(7)

An information processing apparatus configured to:

be connected with communication units of modules respectively having battery units, through a communication path;

when information on the modules is acquired through communication with the communication units, change a count value into one of up and down directions when a communication error is detected by a communication error determination unit, and change the count value into the other direction of the up and down directions when communication being normal is detected by the communication error determination unit;

determine it is a communication error status when the count value becomes a first threshold value; and (8)

The information processing apparatus according to (7), wherein a first amount of change of the count value changed by the communication error and a second amount of change of the count value changed by the communication being normal are equalized.

(9)

The information processing apparatus according to (7), wherein a first amount of change of the count value changed by the communication error is set larger than a second amount of change of the count value changed by the communication being normal.

(10)

The information processing apparatus according to any one of (7), (8), and (9) configured to:

control whether outputs of the modules are allowed;

stop the outputs of the modules in the communication error status; and perform outputs of the modules in the normal status.

(11)

The information processing apparatus according to any one of (7), (8), (9), and (10), wherein the module has a monitoring unit configured to monitor at least a voltage of the battery unit, and the information on the modules includes at least information on the voltage.

(12)

The information processing apparatus according to any one of (7), (8), (9), (10), and (11), wherein a plurality of the modules is connected through a single communication path.

(13)

A power storage device including:

a module including a battery unit having a plurality of battery cells, a monitoring unit configured to detect voltages of the battery unit and of at least one battery cell of the plurality of battery cells, and a communication unit configured to communicate an output signal of the monitoring unit; and an information processing apparatus configured to receive the output signal of the monitoring unit of the module through a communication path, wherein the information processing apparatus is configured to:

when the output signal of the monitoring unit of the module is acquired through communication with the communication units, change a count value into one of up and down directions when a communication error is detected by a communication error determination unit, and change the count value into the other direction of the up and down directions when communication being normal is detected by the communication error determination unit;

determine it is a communication error status when the count value becomes a first threshold value; and resolve the communication error status when the count value becomes a second threshold value different from the first threshold value and return to a normal status.

(14)

The power storage device according to (13), including a plurality of the modules, the plurality of modules being connected through a single communication path, wherein the power storage device is configured to stop an operation when a communication error of at least one of the modules is detected.

(15)

The power storage device according to (13), wherein re-start processing is performed after a predetermined time has elapsed, in a case where the information processing apparatus is reset.

(16)

The power storage device according to (13), wherein the communication unit performs a reset operation when detecting a communication error.

(17)

The power storage device according to any one of (13), (14), (15), and (16), wherein a first amount of change of the count value changed by the communication error is set larger than a second amount of change of the count value changed by the communication being normal.

(18)

The power storage device according to any one of (13), (14), (15), (16), and (17), configured to:

control whether an output of the module is allowed;

stop an output of the module in the communication error status; and perform an output of the module in the normal status.

(19)

The power storage device according to any one of (13), (14), (15), (16), (17), and (18), wherein the module includes a monitoring unit configured to monitor at least a voltage of the battery unit, and the information on the module includes at least information on the voltage.

(20)

An electric vehicle including:

a convertor configured to receive power supply from the power storage device according to (13), and to convert the power into a driving force of the vehicle; and a control device configured to perform information processing related to vehicle control based on information related to the power storage device.

(21)

A power storage device comprising:

a storage module including a battery block;

a controller communicatively coupled to the storage module and configured to:

count a number of communication errors that occur with the storage module;

responsive to the number of communication errors exceeding a first threshold, suspending operation of the storage module;

changing the number of counted communication errors based on at least one communication with the storage module that does not include an error; and responsive to the number of communication errors exceeding a second threshold, resuming operation of the storage module.

(22)

The power storage device according to (21), wherein the storage module includes a plurality of storage modules, and wherein the plurality of storage modules are connected to the controller through a communication path, wherein the power storage device is configured to stop an operation when a communication error of at least one of the storage modules is detected.

(23)

The power storage device according to (21), wherein the controller is configured to perform a reset operation after detecting one of the communication errors.

(24)

The power storage device according to (23), wherein the controller is configured to resume operation after a predetermined time has elapsed, in a case where the controller has been reset.

(25)

The power storage device according to (21), wherein the controller is configured to suspend operation of the storage module by at least one of:

i) stopping the storage module from charging the battery block when the communication errors are detected during a charge operation;

ii) stopping the storage module from discharging the battery block when the communication errors are detected during a discharge operation; and iii) stopping the storage module from providing an output voltage from the battery block when the communication errors are detected during a power supply operation.

(2&)

The power storage device according to (21), further comprising a second storage module, including a second battery block, communicatively coupled to the controller, wherein the controller is configured to at least one of:

count a second number of communication errors that occur with the second storage module;

responsive to the second number of communication errors exceeding the first threshold, suspend operation of the storage module and the second storage module;

reduce the number of counted communication errors for the second number for each communication with the second storage module that does not include an error; and responsive to the second number of communication errors being below the second threshold, resume operation of the storage module and the second storage module.

(27)

The power storage device according to (26), wherein the controller is configured to at least one of:

combine the number of communication errors and the second number of communication errors;

responsive to the combined number of communication errors exceeding the first threshold, suspend operation of the storage module and the second storage module; reduce the combined number of counted communication errors for each communication with the second storage module and the storage module that does not include an error; and responsive to the combined number of communication errors being below the second threshold, resume operation of the storage module and the second storage module.

(28)

A method of operating a storage module comprising:

counting a number of communication errors that occur between a controller and a communicatively coupled storage module, the storage module including a battery block;

responsive to the number of communication errors exceeding a first threshold, suspending operation of the storage module;

changing the number of counted communication errors based on a communication with the storage module that does not include an error; and responsive to the number of communication errors exceeding a second threshold, resuming operation of the storage module.

(29)

The method according to (28), wherein counting the number of communication errors includes:

detecting at least one of a) noise within the communication, b) a decrease in voltage on a power source line connected to the storage module, c) a loss of synchronization with the storage module, d) failure to receive data from the storage module within a predetermined time period;

responsive to detecting at least one of a), b), c), and d), transmitting a data request message from the controller to the storage module; and responsive to not receiving a response to the data request, determining at least one communication error.

(30)

The method according to (28), further comprising responsive to determining the number of communication errors exceeds a third threshold, stopping the count of communication errors.

(31)

The method according to (28), further comprising resetting the controller responsive to the number of communication errors not exceeding the second threshold within a predetermined time period.

(32)

An information processing apparatus comprising:

a controller communicatively coupled to a storage module including a battery block and configured to:

count a number of communication errors that occur with the storage module;

responsive to the number of communication errors exceeding a first threshold, suspending operation of the storage module;

changing the number of counted communication errors based on a communication with the storage module that does not include an error; and responsive to the number of communication errors exceeding a second threshold, resuming operation of the storage module.

(33)

The information processing apparatus according to (32), wherein the first threshold has a numeric value between 5 and 10 and the second threshold has a numeric value between 0 and 2.

(34)

The information processing apparatus according to (32), wherein each communication error is counted as a numeric value between 1 and 3.

(35)

An information processing apparatus according to (32), further comprising:

a regulator configured to detect noise within the communication by detecting a decrease in voltage on a power source line connected to the storage module; and a switch positioned along the power source line configured to be turned off to suspend operation of the storage module.

(36)

The information processing apparatus according to (35), wherein turning off the switch causes at least one of: a) power to be suspended to the storage module, and b) power to be suspended from the storage module.

(37)

An electronic apparatus comprising:

a storage module including a battery block;

a controller communicatively coupled to the storage module and configured to:

count a number of communication errors that occur with the storage module;

responsive to the number of communication errors exceeding a first threshold, suspending operation of the storage module;

changing the number of counted communication errors based on at least one communication with the storage module that does not include an error; and responsive to the number of communication errors exceeding a second threshold, resuming operation of the storage module.

(38)
The electric apparatus according to (37), wherein the electric apparatus is a hybrid vehicle.

(39)
The electric apparatus according to (38), wherein the controller is configured to transmit at least one of the number of communication errors, and an indication whether the operation of the storage module is suspended to a vehicle control device.

(40)
The electric apparatus according to (37), wherein the indication that the storage module is suspended causes the vehicle control device to switch power drive of the hybrid vehicle from a generator powered by the storage module to an engine.

<2. Application>
A Power Storage Device in a Home

An example where a present disclosure is applied to a power storage device for home will be described with reference to FIG. 9. For example, in a power storage device 100 for a home 101, power is supplied to a storage device 103 from a centralized power system 102, such as a thermal power generation 102a, a nuclear power generation 102b, and a hydroelectric power generation 102c via a power network 109, an information network 112, a smart meter 107, and a power hub 108. Along with this, power is supplied to the storage device 103 from an independent power source of a domestic power generating device 104 and the like. The power supplied to the storage device 103 is stored. The power to be used in the home 101 is supplied using the storage device 103. A similar power storage device can be used not only in the home 101, but also in a building and the like.

The home 101 is provided with the power generating device 104, a power consuming device 105, the storage device 103, a control device 110 that controls devices, the smart meter 107, and a sensor 111 that acquires various types of information. The devices are connected through a power network 109 and an information network 112. As the power generating device 104, a solar battery, a fuel cell, and the like are used, and generated power is supplied to the power consuming device 105 and/or the storage device 103. Examples of the power consuming device 105 include a refrigerator 105a, an air conditioner 105b, a television receiver 105c, and a bath 105d. Further, the power consuming device 105 includes an electric vehicle 106. Examples of the electric vehicle 106 include an electric automobile 106a, a hybrid vehicle 106b, and an electric motorcycle 106c.

The above-described power storage device according to an embodiment of the present disclosure is applied to the storage device 103. The storage device 103 includes a secondary battery or a capacitor. For example, a lithium-ion battery is included. The lithium-ion battery may be a fixed type or may be a type used in the electric vehicle 106. The smart meter 107 has a function to measure a used amount of commercial power, and to transmit the measured used amount to a power company. The power network 109 may be any one of or may be a combination of a DC power supply, an AC power supply, and a contactless power supply.

Examples of the various sensors 111 include a motion sensor, a luminance sensor, an object detection sensor, a power consumption sensor, a vibration sensor, a contact sensor, a temperature sensor, and an infrared sensor. Information acquired by the various sensors 111 is transmitted to the control device 110. A status of weather, a status of a human, and the like are grasped with the information transmitted from the sensor 111, so that the power consuming device 105 is automatically controlled, and the energy consumption can be minimized. Further, the control device 110 can transmit information related to the home 101 to an external power company and the like via the Internet.

The power hub 108 performs processing, such as divergence of power lines and AC/DC conversion. Examples of a communication system of the information network 112 connected to the control device 110 include a method of using a communication interface, such as a universal asynchronous receiver-transceiver (UART circuit) and a method of using a sensor network according to a wireless communication standard, such as Bluetooth (registered trademark), ZigBee, and Wi-Fi. The Bluetooth (registered trademark) system is applied to a multimedia communication, and can perform communication of one-to-many connection. ZigBee uses a physical layer for Institute of Electrical and Electronics Engineers (IEEE) 802.15.4. IEEE 802.15.4 is a name of a short distance radio network standard called a personal area network (PAN) or a wireless (W) PAN.

The control device 110 is connected to an external server 113. This server 113 may be managed by any one of the home 101, the power company, and a service provider. Information transmitted/received from/by the server 113 is, for example, related to power consumption information, life pattern information, power rates, weather information, natural disaster information, and electricity transaction. Such information may be transmitted/received from/by a domestic power consuming device (for example, a television receiver), or may be transmitted/received from/by an external device (for example, a mobile phone). Such information may be displayed on a device having a display function, such as a television receiver, a mobile phone, a personal digital assistant (PDA).

The control device 110 that controls various parts is configured from a central processing unit (CPU), a random access memory (RAM), a read only memory (ROM), and the like, and is, in this example, housed in the storage device 103. The control device 110 is connected with the storage device 103, the domestic power generating device 104, the power consuming device 105, the various sensors 111, and the server 113 through the information network 112, and has a function to adjust the used amount of the commercial power and the power generation capacity. Note that the control device 110 may have a function to perform electricity transaction in the power market and the like, other than the above.

As described above, not only the power of the centralized power system 102, such as the thermal 102a, the nuclear 102b, and the water 102c, but also the power generated by the domestic power generating device 104 (solar power generation and wind power generation) can be stored in the storage device 103. Therefore, even if the power generated in the domestic power generating device 104 fluctuates, it can be controlled such that the power sent to an outside can be maintained at a given rate or can be discharged with the necessary amount. For example the power obtained through the solar power generation is stored in the storage device 103 while midnight power, which has a low charge rage at night, is stored in the storage device 103, and the power stored in the storage device 103 can be discharged and used during the daytime when the charge rate is high.

Note that, in this example, a case has been described in which the control device 110 is housed in the storage device 103. However, the control device 110 may be housed in the smart meter 107, or may be independently located. Further, the power storage device 100 may be used to a plurality of homes in an apartment or to a plurality of detached houses.

A Power Storage Device in a Vehicle

An example in which the present disclosure is applied to a power storage device for vehicles will be described with reference to FIG. 9. FIG. 9 schematically illustrates an example of a configuration of a hybrid vehicle that employs a series hybrid system to which the present disclosure is applied. The series hybrid system is a car that runs by a power drive force conversion device, using power generated by a generator driven by an engine, or power generated by the generator and once stored in a battery.

This hybrid vehicle 200 includes an engine 201, a power generator 202, a power drive force conversion device 203, a drive wheel 204a, a drive wheel 204b, a wheel 205a, a wheel 205b, a battery 208, a vehicle control device 209, various sensors 210, and a charging inlet 211. The above-described power storage device according to an embodiment of the present disclosure is applied to the battery 208.

The hybrid vehicle 200 runs with the power drive force conversion device 203 as a power source. An example of the power drive force conversion device 203 is a motor. The power from the battery 208 activates the power drive force conversion device 203, and the rotational force of the power drive force conversion device 203 is transferred to the drive wheels 204a and 204b. Note that, by using direct current-alternating current (DC-AC) or inverse conversion (AC-DC conversion) at a necessary place, the power drive force conversion device 203 can use any of an AC motor and a DC motor. The various sensors 210 control the engine revolution speed through the vehicle control device 209 or control the opening (throttle opening) of a throttle valve (not illustrated). The various sensors 210 include a speed sensor, an acceleration sensor, an engine revolution speed sensor, and the like.

The rotational force of the engine 201 is transferred to the power generator 202, and the power generated by the power generator 202 by using the rotational force can be stored in the battery 208.

When a hybrid vehicle decelerates by a braking mechanism (not illustrated), the resistance force at the time of the deceleration is added as a rotational force to the power drive force conversion device 203, and the regenerative power that is generated by the power drive force conversion device 203 by using the rotational force is stored in the battery 208.

The battery 208, as a result of being connected to an external power supply of the hybrid vehicle, receives power supply from the charging inlet 211 as an input inlet from the external power supply, and can store the received power.

Although not illustrated in the drawings, the present disclosure may include an information processing apparatus that performs information processing for vehicle control based on information on a secondary battery. An example of such an information processing apparatus includes an information processing apparatus that performs display of the remaining amount of a battery based in information on the remaining amount of the battery.

Note that, in the foregoing, a description has been given using, as an example, a series hybrid car that runs using a motor by using power generated by a generator driven by an engine or by using power once stored in a battery. However, the present disclosure can be effectively applied to a parallel hybrid car in which outputs of both an engine and a motor are used as a driving source and in which switching between the following three systems: running using only the engine, running using only the motor, and running using the engine and the motor, is performed as appropriate. In addition, the present disclosure can be effectively applied to a so-called electric vehicle that runs by driving using only a driving motor without using an engine.

<3. Modification>

While the embodiments of the present disclosure have been specifically described, the present disclosure is not limited by these embodiments, and various modifications are possible based on the technical ideas of the present disclosure. For example, the configurations, methods, steps, shapes, materials, and numerical values described in the above-described embodiments are mere examples, and different configurations, methods, steps, shapes, materials, and numerical values may be used, as necessary. For example, the present disclosure can be applied to a system other than the power storage device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

MOD, MOD1 to MODN Storage module
ICNT Main controller
CNT Module controller
C1 to Cn Battery cell
BB1 to BBn Battery unit
3 Bus
11 Cell voltage multiplexer
12 and 19 A/D converter and comparator
13 Monitoring circuit
16 Temperature multiplexer
20 Sub microcontroller unit
21 Communication unit
30 Main microcontroller unit
31 Communication unit
41 Communication error determination
42 Counter
43 Comparison
44, 45, and 46 Threshold value
47 Communication error status output

The invention claimed is:

1. A power storage device, comprising:
a storage module including a battery block; and
a controller communicatively coupled to the storage module and configured to:
count a number of communication errors that occur with the storage module;
suspend an operation of the storage module based on the counted number of communication errors that exceeds a first threshold;
change the counted number of communication errors based on a result of the suspending the operation of the storage module and based on at least one communication with the storage module that lacks an error; and
resume the operation of the storage module based on the changed counted number of communication errors that is equal to a second threshold.

2. The power storage device of claim 1,
wherein the storage module includes a plurality of sub-storage modules, and wherein the plurality of sub-storage modules are connected to the controller via a communication path, wherein the power storage device is configured to stop the operation based on a detection of a communication error of at least one of the plurality of sub-storage modules.

3. The power storage device of claim 1, wherein the controller is further configured to reset the operation based on a detection of one of the counted number of communication errors.

4. The power storage device of claim 3, wherein the controller is further configured to resume the operation after a determined time has elapsed, based on the reset operation of the controller.

5. The power storage device of claim 1, wherein to suspend the operation of the storage module, the controller is further configured to:
stop the storage module to charge the battery block based on the counted number of communication errors that exceeds the first threshold being detected during a charge operation;
stop the storage module to discharge the battery block based on the counted number of communication errors that exceeds the first threshold being detected during a discharge operation; and
stop the storage module to provide an output voltage from the battery block based on the counted number of communication errors that exceeds the first threshold being detected during a power supply operation.

6. The power storage device of claim 1, further comprising a second storage module, including a second battery block, communicatively coupled to the controller, wherein the controller is further configured to:
count a second number of communication errors that occur with the second storage module;
suspend a second operation of the storage module and the second storage module based on the counted second number of communication errors that exceeds the first threshold;
reduce the counted second number of communication errors for each communication with the second storage module that lacks the error; and
resume the second operation of the storage module and the second storage module based on the counted second number of communication errors that is equal to the second threshold.

7. The power storage device of claim 6, wherein the controller is further configured to:
combine the counted number of communication errors and the counted second number of communication errors to generate a combined number of communication errors;
suspend the second operation of the storage module and the second storage module based on the combined number of communication errors that exceeds the first threshold;
reduce the combined number of communication errors for each communication with the second storage module and the storage module that lacks the error; and
resume the second operation of the storage module and the second storage module based on the combined number of communication errors that is below the second threshold.

8. A method of operating a storage module, the method comprising:
counting a number of communication errors that occur between a controller and the storage module communicatively coupled with the controller, the storage module including a battery block;
suspending an operation of the storage module based on the counted number of communication errors that exceeds a first threshold;
changing the counted number of communication errors based on a result of the suspending the operation of the storage module and based on a communication with the storage module that lacks an error; and
resuming the operation of the storage module based on the changed counted number of communication errors that is equal to a second threshold.

9. The method of claim 8,
wherein the counting the number of communication errors includes:
detecting, to generate a detection result, at least one of noise within the communication, a decrease in voltage on a power source line connected to the storage module, a loss of synchronization with the storage module, or a failure to receive data from the storage module within a determined time period;
transmitting a data request message from the controller to the storage module based on the detection result; and
determining at least one communication error based on a lack of a response to the data request message.

10. The method of claim 8, further comprising stopping the counting the number of communication errors based on a determination that the counted number of communication errors exceeds a third threshold.

11. The method of claim 8, further comprising resetting the controller based on the counted number of communication errors that is less than or equal to the second threshold within a determined time period.

12. An information processing apparatus, comprising:
a controller communicatively coupled to a storage module that includes a battery block, wherein the controller is configured to:
count a number of communication errors that occur with the storage module;
suspend an operation of the storage module based on the counted number of communication errors that exceeds a first threshold;
change the counted number of communication errors based on a result of the suspending the operation of the storage module and based on a communication with the storage module that lacks an error; and
resume the operation of the storage module based on the changed counted number of communication errors that is equal to a second threshold.

13. The information processing apparatus of claim 12, wherein the first threshold has a first numeric value between 5 and 10 and the second threshold has a second numeric value between 0 and 2.

14. The information processing apparatus of claim 12, wherein each communication error is counted as a third numeric value between 1 and 3.

15. The information processing apparatus of claim 12, further comprising:
a regulator configured to detect noise within the communication based on a detection that voltage on a power source line connected to the storage module is decreased; and
a switch positioned along the power source line, wherein the switch is configured to turn off for the suspending the operation of the storage module.

16. The information processing apparatus of claim 15, wherein, based on the turn off of the switch, power is suspended to the storage module, and the power is suspended from the storage module.

17. An electronic apparatus, comprising:
a storage module that includes a battery block; and
a controller communicatively coupled to the storage module and configured to:
count a number of communication errors that occur with the storage module;
suspend an operation of the storage module based on the counted number of communication errors that exceeds a first threshold;
change the counted number of communication errors based on a result of the suspending the operation of the storage module and based on at least one communication with the storage module that lacks an error; and
resume the operation of the storage module based on the changed counted number of communication errors that is equal to a second threshold.

18. The electronic apparatus of claim 17, wherein the electric apparatus is a hybrid vehicle.

19. The electronic apparatus of claim 18, wherein the controller is further configured to transmit at least one of the counted number of communication errors, and an indication information that indicates whether the operation of the storage module is suspended to a vehicle control device.

20. The electronic apparatus of claim 19, wherein the indication information that indicates the storage module is suspended causes the vehicle control device to switch a power drive of the hybrid vehicle from a generator powered by the storage module to an engine.

* * * * *